J. E. WHITE.
Water Cooler.
No. 102,455.                  Patented April 26, 1870.
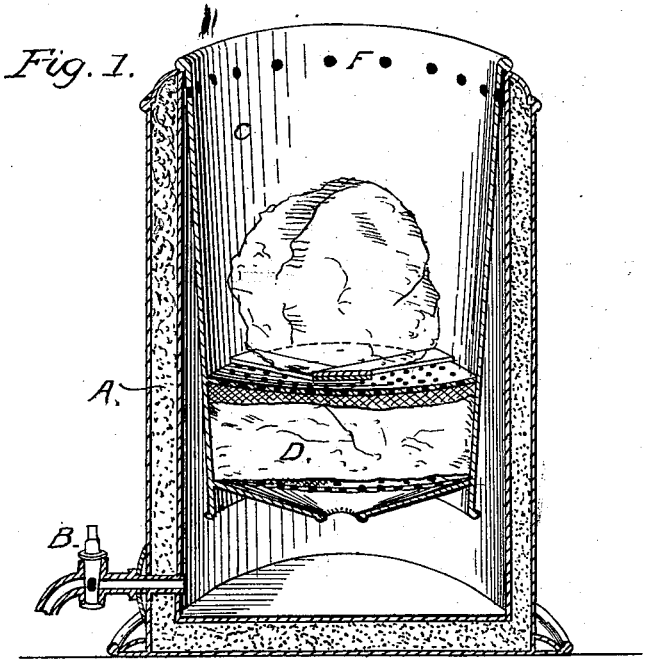
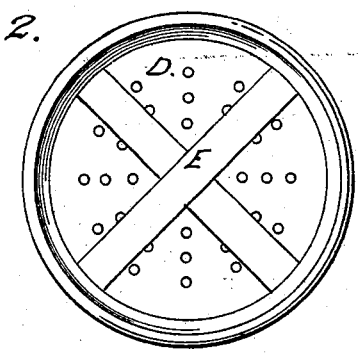

United States Patent Office.

JAMES E. WHITE, OF NEW YORK, N. Y.

Letters Patent No. 102,455, dated April 26, 1870.

IMPROVEMENT IN COMBINED FILTER AND COOLER.

The Schedule referred to in these Letters Patent and making part of the same.

*To all whom it may concern:*

Be it known that I, JAMES E. WHITE, of the city of New York, in the county of New York and State of New York, have invented certain Improvements in Combined Filter and Cooler, of which the following is a specification, reference being had to the accompanying drawings.

My invention relates to combined filters and coolers, and consists in constructing a filter at the lower end of a cylindrical vessel, and arranging over it supports for ice, and in providing this vessel with a series of holes or openings near its upper end, and in suspending it within a cooler, as hereinafter explained.

In the drawings—

Figure 1 is a longitudinal vertical section of my filter and cooler, with the cover removed, and with a lump of ice resting upon its supports; and Figure 2 is a top-plan view of the supports for the ice, as arranged over the filter.

The object of my invention is to provide a filter and cooler that will furnish filtered water sufficiently cool for drinking purposes, and will do this without any unnecessary waste of ice.

I make a cooler, A, of any size desired, out of suitable material, and in the ordinary cylindrical form, providing it with the usual faucet, B.

I then make a cylindrical vessel, C, of zinc or other suitable material, tapering from top to bottom, as shown in fig. 1, its upper end being turned ever so as to form a flange or shoulder, and of the proper size to admit of its being suspended within the cooler by means of this flange, as shown in the same figure.

In or near its lower end I place a pulverized quartz filter, D, constructed in the usual manner, by placing the quartz between sheets of fine wire-gauze, and then compressing and confining the whole between two perforated metallic disks, as shown in said fig. 1.

Above the filter D, I place two flat cross-bars, E, at right angles with each other, and a short distance from the filter, for the ice to rest upon and be held free from contact with the upper surface of the filter, as clearly shown in figs. 1 and 2.

Near the upper end of the vessel C, forming the filter, I make a series of holes or openings, F, so arranged as to open into the space between the cooler and filter, so that there may be a constant interchange of air between them.

In using my filter and cooler, I take a lump of ice of any size desired and place it on the cross-bars E, then pour in the water, and put on the cover. After the water has passed over the ice and through the filter, it will be sufficiently cold for drinking purposes. But, after the water has left the ice, it will still be kept cool by the low temperature caused by the presence of the ice in the filter and the water flowing from it as it melts away. As the ice, however, is not in contact with the water, it will melt away much slower than if surrounded by the water, and will, consequently, keep the water cool much longer than if in contact with it. As the filter C is made tapering, there is an open space between it and the sides of the cooler, which space communicates with the chamber of the filter, and thus the air in each can flow into the other, so as to keep the temperature in each about the same.

This construction of filter and cooler not only preserves the ice and furnishes cool water for a much longer time than the ordinary devices for this purpose, but the filter can always be readily and conveniently cleaned, it being only necessary to remove it from the cooler, turn it bottom side up, and pour water through it in that direction.

Having thus described my invention,

What I claim is—

1. In combination with a cooler, A, a movable filtering-vessel, C, having curved or arched ice-supporting cross-bars E above the filter, and openings F near its upper end, the whole constructed and arranged substantially as herein described.

2. In combination with the suspended filtering-vessel C, the curved or arched cross-bars E, constructed and arranged substantially as described, for holding the ice so that it may be surrounded by the cold air, as set forth.

JAMES E. WHITE.

Witnesses:
H. B. MUNN,
LOUIS A. COUVET.